United States Patent Office 2,862,855
Patented Dec. 2, 1958

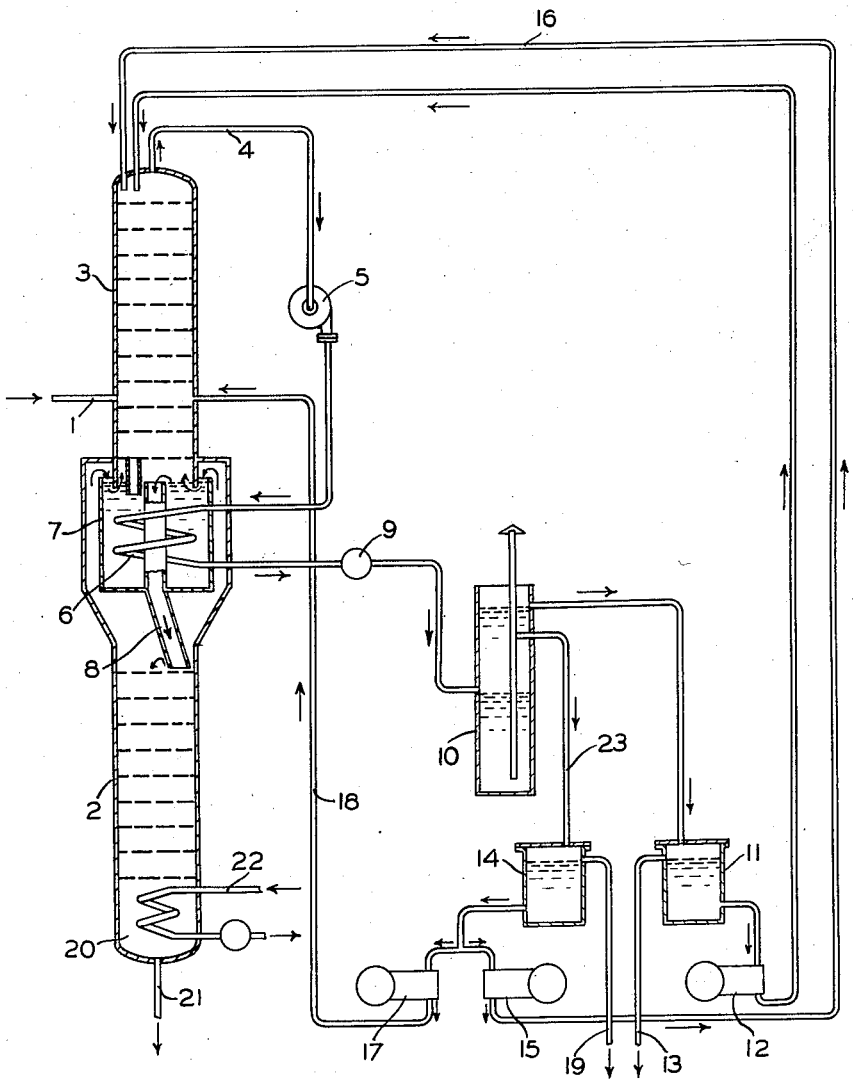

2,862,855

AZEOTROPE DISTILLATION OF AROMATIC ISOPROPYL COMPOUNDS FROM PHENOL

Karl Friedrich Lang, Frankfurt am Main, Heinrich Schildwächter, Castrop-Rauxel, and Adolf Hupe, Frankfurt am Main, Germany, assignors to Rutgerswerke-Aktiengesellschaft, Frankfurt, Germany Application November 19, 1952, Serial No. 321,394

Claims priority, application Germany November 24, 1951

7 Claims. (Cl. 202—42)

This invention relates to a method and device for the separation of phenols from aromatic isopropyl compounds and it has particular relation to the separation of these compounds in mixtures formed by decomposition of hydroperoxides obtained by oxidation of aromatic isopropyl compounds.

In the production of synthetic phenols by oxidation of aromatic isopropyl compounds, particularly oxidation of cumene to cumene hydroperoxide, and decomposition of the crude reaction product, mixtures are obtained, which essentially consists of the unreacted isopropyl compound, phenol and acetone. In addition to the removal of acetone by distillation from said mixture, the isopropyl compound must be practically completely separated from the phenol, before the isopropyl compound can be submitted again to oxidation, because even small amounts of phenol disturb the oxidation of aromatic isopropyl compounds. Decomposition of the cumene hydroperoxide takes place apparently according to the following scheme:

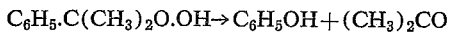

$$C_6H_5 \cdot C(CH_3)_2O \cdot OH \rightarrow C_6H_5OH + (CH_3)_2CO$$

It has been suggested previously to remove unoxidized cumene from the reaction mixture resulting from oxidation of cumene, prior to the decomposition of the hydroperoxide compound. However, the several steps of chemical and physical treatments to be used in this connection, are rather troublesome. Thus, it has been known to extensively separate cumene from hydroperoxide by distillation, but the latter must be stopped, on account of danger of explosion, as soon as the hydroperoxide reaches a certain concentration. The mixture is then decomposed and distilled again in order to remove acetone and residual cumene, but a cumene, which is sufficiently free from phenol, cannot be obtained in this manner without the use of additional chemical purifying procedures. In view of this situation, there was a need for a simpler method for the separation and preparation in pure condition of cumene and phenol obtained by decomposition of the reaction mixtures formed in the above mentioned oxidation processes.

Complete separation of a cumene-phenol mixture by distillation and fine fractionation is practically not possible, because cumene and phenol form "quasi azeotropic" mixtures (see, for example, M. Lecat, "Tables azeotropiques," page 319, Brussels, 1949). By subjecting phenol-cumene mixtures obtained by decomposition of cumene hydroperoxide, to fine fractionation under vacuum, cumene distillates are obtained, which— depending on the conditions of fractionation and independently from the concentration of phenol down to a minimum of 5% in the material distilled—contain 4–8% phenol. In the presence of such amounts of phenol, oxidation of cumene to the hydroperoxide, becomes difficult and uneconomical. Therefore, separation of cumene and phenol by distillation and fractionation alone has been given up, and it has been tried to combine said separation with extraction methods. For example, it has been suggested to recover residual phenol from the cumene distillate by extraction with aqueous alkali, e. g. a 10% aqueous solution of NaOH, or by precipitation with liquid ammonia. However, as conventional extraction with alkaline solutions, subsequent recovery of phenol from the alkaline solutions, and processing of the resulting alkali carbonate solutions, is too troublesome, requires extensive apparatus and would be uneconomical, it has been recently suggested to recover the total amount of phenol from the decomposed crude reaction mixture by extraction with hot water. But in this process too, the last residues of phenol must be extracted with alkali from the cumene. The cooled, aqueous phenol extract, which contains about 2.5% phenol, can be extracted with butyl acetate and the resulting extract can be separated by simple distillation into phenol and butyl acetate. Cumene obtained in this manner is supposed to contain about 2% of the phenol originally present in the mixture to be processed. Thus, for example, at a content of 25% phenol, the cumene would still contain 0.5% phenol, after application of said extraction procedure. The latter requires handling of relatively large amounts of liquids, necessitates the use of particular devices or apparatus for carrying out the individual steps and its heat consumption is rather high. Last, but not least, a concentration of about 0.5% phenol in the cumene is still too high and does not permit repeated oxidation of the cumene, without previous removal of phenol with alkali.

It has now been unexpectedly found, that a practically complete separation of phenols, some of which are liquid and others solid at ordinary room temperature, e. g. 15°–25° C., from the aromatic isopropyl compounds, can be obtained by distilling off the total amount of isopropyl compounds in the presence of water from reaction mixtures of the above described type, i. e. decomposition products of the hydroperoxides, and recovering phenols from the distillation residue in conventional manner.

It has been found that by carrying out distillation of the isopropyl compound in this manner, i. e. in the presence of water, an azeotropic binary mixture of water and the respective isopropyl compound is distilled off, while the phenolic compound remains in the distillation residue, and can be recovered from the latter e. g. by distillation, crystallization or other suitable steps.

The process of the invention has the following advantages: (a) separation of the aromatic isopropyl compound from phenol, can be carried out in a single step; (b) the necessary apparatus is very simple; (c) the main ingredients of the reaction mixture are practically completely separated and quantitatively recovered. The isopropyl compound thus obtained is either free from phenol or contains only traces of phenol, and can be used directly for oxidation or for any other purpose.

In carrying out the invention, water is added to cumene-phenol mixtures of any origin and/or composition, and the resulting mixture is then subjected to distillation, in which cumene and water form an azeotropic mixture having a minimum boiling point. The hydroperoxide formed by oxidation can be decomposed immediately after oxidation and acetone and cumene can be completely removed from the decomposition product by mere distillation, whereby the cumene is obtained in such condition of purity, that it can be reintroduced into the oxidation process directly, i. e. without any chemical purification.

It has been further found that in a manner similar to that of the conversion of cumene into phenol, isopropyl compounds containing aromatic radicals substituted in the nucleus, or containing polynuclear aromatic radicals, can be likewise converted by oxidation and subsequent decomposition into the corresponding phenols. For example, o-, m- and p-cresol can be prepared from the corresponding o-, m- and p-cymene, or phenols containing two or more —OH groups, e. g. resorcinol, pyrocatechol, hydroquinone, pyrogallol and the like can be prepared from the corresponding isopropyl compounds. In an analogous manner, alpha-naphthol or beta-naphthol can be prepared over isopropyl-naphthalene hydroperoxide in similar manner. In all these reactions, the decomposed reaction product contains a certain amount of the unreacted isopropyl compound in mixture with the phenol compound formed. In subjecting such mixtures to conventional distillation, with or without vacuum, azeotropic mixtures of the isopropyl compound and the phenol compound are formed so that the isopropyl compound obtained by distillation contains phenol and, therefore, cannot be reintroduced without further purification into the oxidation process.

In carrying out the invention, in order to form azeotropic mixtures of the isopropyl compound and water, having a minimum boiling point, a suitable amount of water is added to the mixture containing the phenol and the isopropyl compound and the ternary mixture thus formed is subjected to distillation e. g. in a distilling apparatus provided with a fractionating column, dephlegmator and other conventional elements. It has been found that the addition of at least 0.5 part by weight of water for 1 part of the isopropyl compound, and, if necessary, the addition of at least 1.5 parts by weight of water for 1 part by weight of the isopropyl compound, yields satisfactory results. Higher amounts of water may also be used. This ratio is essentially influenced by the amount of the phenol in the starting mixture, because the isopropyl compound continues to distill off in pure form as an azeotropic mixture, as long as the above stated ratio is observed in the distilling still.

In carrying out the present invention with materials containing phenols other than $C_6H_5OH$, in mixture with isopropyl compounds having higher boiling points and containing substituted or polynuclear aromatic radicals, merely the composition of the azeotropic mixture is changed, in comparison with mixtures containing $C_6H_5OH$ and cumene. The higher the boiling point of the isopropyl compound is, the higher the proportion of water and the lower the proportion of the isopropyl compound, in the azeotropic distillate will be. While in the treatment of cumene, the proportion of cumene: water in the distilling azeotropic mixture corresponds to 1.5:1, in the case of p-cymene, the proportion p-cymene: water is 1:1, and in the case of the rather high-boiling alpha-isopropyl naphthalene, its proportion to water is 1:5. The boiling points of the distilling binary mixtures show little change. They are in the range of 95°–99.5° C., but show decidedly a minimum boiling point.

Although with increasing boiling point of the isopropyl compound, the proportion of water in the azeotropic mixture increases, and, therefore, the amount of heat needed in the method of the invention is correspondingly increased, the invention still has the advantage that the isopropyl compounds of relatively high boiling points can be distilled off at temperatures below 100° C. and obtained substantially free from phenols. Furthermore, the low distillation temperature protects the materials treated from undesired changes and this is also an important advantage in view of the tendency of certain phenols of being easily decomposed at elevated temperatures. This advantage results in improved quality and higher yields of the phenols.

Distillation according to the present invention can be carried out at ordinary atmospheric pressure, as well as at diminished pressure, i. e. partial vacuum, or under super-atmospheric pressure. In distilling under super-atmospheric pressure, the use of 2 to 5 or 6 atmospheres pressure, above normal pressure, is preferred.

Furthermore, distillation according to the invention can be carried out as a discontinuous or continuous process, the continuous distillation being particularly advantageous. In proceeding discontinuously, first the isopropyl component, e. g. cumene, of the ternary starting mixture is distilled off. The subsequent intermediate fraction consists of residual water, small amounts of phenol and isopropyl component, while the phenol fraction is obtained as the distillation residue. If necessary, the phenol fraction can be distilled in order to separate it from impurities.

The first fraction, which consists of the isopropyl component and water, is separated into the isopropyl component and water and the latter as well as said intermediate fraction are either caused to continuously flow back to the batch distilled or added to fresh raw material to be oxidized, so that practically no losses occur. Thus, 90–95% of the isopropyl compound are directly recovered with a phenol content which somewhat varies, depending on the efficiency of the fractionating column and the working conditions, but does not exceed a few hundredths percent.

It has been further found that after removing acetone by distillation from the reaction mixture containing phenol and unreacted cumene, by subjecting said reaction mixture to continuous fractional distillation, in the presence of water, with a single fractionating column, the entire amount of cumene can be obtained free from phenol directly from the head of the column and the entire amount of phenol can be obtained free from cumene from the sump of the column. The amount of heat needed in this continuous procedure, is very low.

Such continuous distillation according to the invention is carried out in an apparatus of the type described hereinafter, in which the mixture to be distilled, as well as water, are continuously introduced into the middle part of a fractionating column, and the total amount of water and cumene escape at the head of the column at a temperature of about 95° C., while the phenol is discharged from the sump at about 183° C. It has been found preferable to use a reflux ratio of at least 5:1. The water is introduced into the column in such amount that the ratio water: cumene present in the mixture introduced into the column, corresponds to 0.67:1 by volume. Methyl styrene present in the reaction mixture to be distilled, is distilled over together with cumene in the above procedure. The distillate thus obtained can be reused directly for oxidation, after separating the water from the cumene. Acetophenone present in the reaction mixture to be distilled is recovered together with phenol in the sump. The phenol fraction discharged from the sump is further processed in conventional manner.

The water separated from the distillate obtained at the head of the fractionating column is reintroduced into the column preferably at its middle part. By proceeding in this manner, no particular adjustment of the amount of water to be introduced into the column is necessary, because, at a suitable reflux ratio, a constant ratio of water: cumene of 0.67:1 is automatically obtained at the head of the column. Thus, at constant supply of the mixture to be distilled, circulation of water is automatically adjusted. Losses of the circulating water can be compensated in accordance with the temperatures occurring at middle height of the column, by additional supply of water. It is preferred to have a temperature of about 100° C. at the level, at which the liquids are introduced into the column.

In carrying out continuous distillation according to the invention, preferably a dephlegmator is used, the cooling effect of which—at constant supply of the liquids and constant temperature of the sump—can be controlled by the pressure in the vapor space above the sump, or by the pressure in the vapor space of a middle portion of the column.

According to a modification of the distilling procedure a total condenser is used, if the water escaping at the head of the column, is reintroduced into the column at the head. In this case, the vapors are completely condensed and the total condensed product is separated into water and isoproply component. The total amount of water is then reintroduced into the column, while the isopropyl component is divided into reflux and product to be discharged. In this manner too, cumene containing less than 0.1% phenol, can be obtained.

By applying the principle of subjecting the vapors to compression, the amount of heat necessary for separation of the components, can be essentially reduced. However, it is necessary that the heat liberated at excess pressure be transferred to the liquid flowing downward at a middle level of the column. In this connection, it is preferred to select a level, at which the liquid phase of the column still contains water. By proceeding in this manner the change of temperature in the vapors in the device for compression of the vapors can be kept rather low and the process can be carried out very economically. An increase of pressure of 0.2–0.4 kg./cm.$^2$ in the compressor, corresponding to an increase of 5°–10° C. of temperature, is sufficient. It has been found that the difference of temperatures at the head and sump of the column is so high that compression of vapors cannot be carried out economically, if the condensation heat is supplied to the reheater of the sump. A mechanical compressor, as well as a steam jet compressor, can be used. In using a steam jet compressor, the condensation heat of the power steam can be additionally utilized. As the water present in the distillate is separated anyhow from the product obtained at the head, the steam jet compressor does not require the use of additional apparatus.

The following examples describe some embodiments of the invention, to which the invention is not limited, and the drawing illustrates, likewise by way of example, an apparatus carrying out continuous distillation according to the invention. The parts are parts by weight, if not otherwise stated.

*Example 1*

To a reaction mixture of the above described type, containing 75 parts of cumene and 25 parts of phenol, 75 parts of water are added and the resulting ternary mixture is subjected to discontinuous distillation in an apparatus provided with a fractionating column, dephlegmator and other conventional parts, at a reflux ratio of 1:6, under ordinary atmospheric pressure. The main fraction of cumene boils constantly at about 94°–95° C. while the temperature in the distilling still is 97°–98° C. The condensed cumene fraction separates into a layer of cumene and a layer of water, the latter being reintroduced into the distilling vessel at such rate that the ratio cumene:water amounts always to at least 1:1. After about 69 kg. of cumene, i. e. 92%, are recovered as a distillate, distillation is switched—without supplying any further amount of water to the distilling still—to an intermediate fraction. After the residual cumene is completely distilled over, the temperature rises to 100°–105° C. At this temperature, the water is completely distilled off and is obtained as a distillate together with the rest of cumene (about 5.8 kg.) whereupon the temperature in the still rises quickly to 183° C.

The cumene fraction thus obtained contains only 0.03% of phenol, while the aqueous intermediate fraction contains 4.32% of phenol. This intermediate fraction is added to the next batch of cumene mixture to be distilled. The phenol fraction obtained as a residue in the still is free from cumene and water, and its phenol content is recovered without any loss.

*Example 2*

To a reaction mixture containing 75 kg. of p-cymene and 25 kg. of p-cresol, 75 kg. of water are added and the resulting mixture is subjected to distillation in an apparatus similar to that described in Example 1, under ordinary atmospheric pressure, at a reflux ratio of 1:5, in a manner substantially analogous to that described in Example 1. The starting material is separated into a main cymene fraction consisting substantially of p-cymene and water, an intermediate fraction containing p-cymene, p-cresol and water, and a p-cresol distillation residue substantially free from p-cymene. The main fraction of cymene boils constantly at about 97° C., while the temperature in the distilling still rises quickly to 202° C. toward the end of distillation. The p-cymene fraction thus obtained contains only 0.02–0.04% of p-cresol, while the aqueous intermediate fraction contains about 5% of p-cresol. This intermediate fraction is added to the next batch of p-cymene mixture to be distilled. The residue in the distilling still consists practically of pure p-cresol, which is recovered as such, or by redistillation in conventional manner.

*Example 3*

A mixture containing 225 kg. of p-cymene and 75 kg. of a mixture of o-, m- and p-cresol boiling in the range of 192–210° C., was mixed with 225 kg. of water and subjected to distillation substantially under the conditions and in a manner analogous to those described in Examples 1 and 2. Thereby, boiling constantly at 97° C., first a water-p-cymene mixture was distilled off, from which, after separation of water from the distillate, a p-cymene containing 0.04–0.08% of cresols was obtained. This p-cymene can be directly used for oxidation.

*Example 4*

To a mixture of 75 kg. of pyrogallol and 225 kg. of 1,3,5-triisopropyl benzene, 225 kg. of water were added, and the resulting product was subjected to distillation substantially under the conditions and in a manner analogous to those described in Examples 1 and 2. The first fraction consisting of a mixture of water and 1,3,5-triisopropyl benzene boiled constantly at 99° C. and the 1,3,5-triisopropyl benzene recovered by separation of water contained about 0.004% of pyrogallol. The subsequent intermediate fraction was recovered after about 92% (i. e. 207 kg.) were distilled over. The residue in the distilling still, which consisted of pyrogallol and water, was further processed in conventional manner.

*Example 5*

To a mixture of 75 kg. of beta-isopropyl naphthalene and 25 kg. beta-naphthol 75 kg. of water are added and the resulting mixture is subjected to distillation substantially under the conditions and in a manner analogous to those described in Examples 1 and 2. The first fraction consisting of a binary mixture of water and beta-isopropyl-naphthalene boiled constantly at 99.2° C. and yielded a mixture which separated into 5 parts of water for 1 part of beta-isopropylnapthalene, and contained only traces of beta-naphthol. The residue in the distilling still consisted of beta-naphthol and water only.

*Example 6*

Continuous fractional distillation of a mixture containing 1 part of phenol and 3 parts of cumene is carried out under atmospheric pressure in the apparatus diagrammatically illustrated in the drawing.

In the apparatus shown in the drawing, the mixture of cumene and phenol to be distilled is continuously introduced into the upper part 3 of a fractionating column provided with conventional trays, through tube 1. Simultaneously, water is introduced into the column at about the same level through tube 18, the ratio water:cumene being 0.67:1. The ascending vapors of cumene and water are drawn off at a temperature of about 95° C. at the head of the column and are conducted through tube 4 to compressor 5 for compressing the vapors. From compressor 5, the vapors are conducted to coil 6. In compressor 5, pressure is increased by about 0.2–0.4 kg./cm.$^2$ so that the vapors condensed in coil 6 have a temperature of at least 100° C. Said coil 6 is placed in a trough 7, which is adapted to receive the reflux flowing downward in the column. By the heat of condensation, set free in coil 6, the reflux liquid is partly vaporized again and the vapors rise to the head of the column. The amount of water in the column is adjusted in such manner that the liquid in trough 7 contains essential amounts of water. The excess of the condensed liquid in trough 7 flows through overflow tube 8 to the highest tray on plate of lower part 2 of the fractionating column. By supplying heat through reheater 22 to sump 20 of lower part 2 of the column, the temperature of the sump is maintained at about the boiling temperature of phenol, so that material discharged through tube 21, is free from cumene. Condensed liquid discharged from coil 6, is relieved from pressure in condensing pot 9 and flows to separating vessel 10. Cumene overflows from separating vessel 10 to receiver 11. From the latter, pump 12 supplies the desired amount of cumene, as a reflux, to the head of the fractionating column, while cumene overflows through tube 13 and is discharged. Water separated in vessel 10 flows through tube 23 to receiver 14. From the latter, pump 15 supplies water, serving as reflux, through tube 16 to the head of the fractionating column in such amount, that the reflux contains water and cumene in the proportion of 0.67:1. Another pump 17 supplies water through tube 18 to the fractionating column in an amount corresponding to the amount of the material to be distilled, which is supplied to the column through tube 1. Excess water can overflow from receiver 14 through tube 19.

If the water should be introduced into the column only at the head of the column, pump 17 has to be stopped and water, in an amount corresponding to the total amount of cumene reintroduced at the head of the column, should be supplied by pump 15 to the head of the column.

If instead of mechanical compressor 5, a steam jet compressor is used, an amount of condensed water, corresponding to the amount of power steam, will flow through overflow tube 19 of receiver 14.

*Example 7*

Isopropyl compounds containing substituted or polynuclear aromatic radicals can be separated from the corresponding phenols by continuous fractional distillation in the presence of water, in a manner and in an apparatus substantially analogous to those described in Example 6. The amount of water to be added to the mixture of isopropyl compound with phenol, should be adjusted to the individual isopropyl compound to be distilled, as already stated above.

For example, in treating a mixture of 75% of p-cymene and 25% of p-cresol, water was introduced in the ratio of 1 volume water for 1 volume of p-cymene, and p-cymene was substantially quantitatively separated from p-cresol in a manner and in an apparatus analogous to those described in Example 6. From a similar mixture of p-cymene with a mixture of o-, m- and p-cresol, p-cymene could be likewise recovered in substantially pure condition, after the addition of the same amount of water.

*Example 8*

To a mixture of 75 parts of beta-isopropylnaphthalene and 25 kg. of beta-naphthol 375 parts of water was added and the isopropyl compound was substantially quantitatively separated from the mixture by continuous fractional distillation in an apparatus and in a manner substantially analogous to those described in Example 6.

It will be understood that the present invention is not limited to the specific materials, procedures, devices and other specific details described above, and can be carried out with various modifications. Thus, the invention can be applied to the separation of mixtures of phenols and aromatic isopropyl compounds, of an origin and composition other than those described above. Furthermore, as already stated above, the proportion of water used in carrying out the invention, can be varied. Any efficient fractionating column can be used in carrying out the invention, for example, a fractionating column provided with 20–40 bubble trays or bubble plates. Continuous distillation can be carried out also under a pressure lower or higher than ordinary atmospheric pressure. These and other modifications can be made without departing from the scope of the invention as defined in the appended claims.

The term "reflux ratio" is used herein to denote the ratio of the liquid reflux rate at the top of the column to the overhead product.

What is claimed is:

1. A method of separating an isopropyl compound containing an aromatic radical, from a phenol capable of being formed from said isopropyl compound by oxidation and decomposition of the oxidation product, in which a mixture of said isopropyl compound and phenol is subjected to continuous fractional distillation with water in a fractionating column in order to form a vaporized azeotropic mixture substantially consisting of the isopropyl compound and water, and a distillation residue containing the phenol and being free from the isopropyl compound, said azeotropic mixture being subjected to condensation and separation into isopropyl compound and water, and the separated water and part of the separated isopropyl compound being continuously reintroduced into the fractionating column, said azeotropic mixture being distilled off with a reflux ratio for the organic phase, of at 5:1.

2. A method as claimed in claim 1, in which a mixture of the isopropyl compound with phenol is continuously introduced into the middle part of a fractionating column in which water is present, and the ternary mixture of the isopropyl compound, phenol and water thus formed is subjected to continuous fractional distillation in said column, in order to form (a) a vaporized azeotropic mixture substantially consisting of the isopropyl compound and water, and to be discharged at the top of the column and (b) a distillation residue containing the phenol and being free from the isopropyl compound; subjecting said azeotropic mixture to condensation and separation into isopropyl compound and water and continuously reintroducing the separated water and part of the separated isopropyl compound into the top of the fractionating column.

3. A method as claimed in claim 1, in which a reaction mixture which has been formed by oxidation of an isopropyl compound to hydroperoxide and decomposition of the oxidation product, and consists substantially of unreacted isopropyl compound, a phenol and acetone, after the removal of acetone by distillation, is subjected to continuous fractional distillation in the presence of water in a fractionating column in order to form a vaporized azeotropic mixture substantially consisting of the isopropyl compound and water, and a distillation residue containing the phenol and being free from the isopropyl compound, said azeotropic mixture being subjected to condensation and mechanical separation into isopropyl compound and water, and the separated water and part of the separated isopropyl compound being continuously reintroduced into the fractionating column, the isopropyl compound being discharged substantially free from phenol, and the phenol-containing distillation residue being substantially free from the isopropyl compound.

4. A method as claimed in claim 1, in which a mixture of cumene and phenol is subjected to separation.

5. A method as claimed in claim 1, in which a mixture of a cymene and a cresol is subjected to separation.

6. A method as claimed in claim 1, in which a mixture of an isopropyl naphthalene and a naphthol is subjected to separation.

7. A method of separating cumene from phenol, comprising subjecting a mixture of phenol and cumene to continuous distillation under atmospheric pressure with water, in order to form an azeotropic mixture of the isopropyl compound and water, and distilling off said azeotropic mixture at a temperature at the top of the column of 92°–96° C. with a reflux ratio for the organic phase of at least 5:1.

References Cited in the file of this patent

UNITED STATES PATENTS

| | | |
|---|---|---|
| 1,909,546 | Molinari | May 16, 1933 |
| 2,437,649 | Milner | Mar. 9, 1948 |
| 2,487,884 | Lunt | Nov. 15, 1949 |
| 2,509,136 | Cornell | May 23, 1950 |
| 2,597,497 | Joris | May 20, 1952 |
| 2,619,453 | Anderson | Nov. 25, 1952 |
| 2,628,984 | Aller et al. | Feb. 17, 1953 |
| 2,640,018 | Heath | May 26, 1953 |
| 2,702,784 | Rossi | Feb. 22, 1955 |

FOREIGN PATENTS

| | | |
|---|---|---|
| 649,286 | Great Britain | Feb. 17, 1953 |
| 670,444 | Great Britain | Apr. 16, 1952 |